United States Patent [19]

Instance

[11] Patent Number: 4,675,062

[45] Date of Patent: Jun. 23, 1987

[54] METHOD AND APPARATUS FOR MAKING LABELS

[76] Inventor: David J. Instance, Past Heap Farm, Pembury, Tunbridge Wells, Kent, England

[21] Appl. No.: 731,724

[22] Filed: May 8, 1985

[30] Foreign Application Priority Data

May 18, 1984 [GB] United Kingdom ................. 8412739

[51] Int. Cl.[4] ............................................ B32B 31/18

[52] U.S. Cl. .................................... 156/227; 156/250; 156/253; 156/267; 156/268; 156/443; 156/510; 156/516; 156/519; 156/552

[58] Field of Search ............... 156/250, 253, 267, 268, 156/227, 510, 516, 521, 552, 227, 443, 519

[56] References Cited

U.S. PATENT DOCUMENTS

| | | | |
|---|---|---|---|
| 2,805,183 | 9/1957 | Higgins | 156/268 |
| 3,708,375 | 1/1973 | Kistner | 156/267 |
| 4,153,496 | 5/1979 | Swift | 156/267 |
| 4,359,358 | 11/1982 | Hattemer | 156/268 |
| 4,488,922 | 12/1984 | Instance | 156/267 |
| 4,560,432 | 12/1985 | Instance | 156/552 |

*Primary Examiner*—Caleb Weston
*Attorney, Agent, or Firm*—Birch, Stewart, Kolasch & Birch

[57] ABSTRACT

A self-adhesive label on a release backing material comprising a sheet which has been folded so that an upper sheet portion covers, and extends over an edge of, a lower sheet portion, the upper surface of the upper sheet portion bearing a desired lithographically printed image and the two opposed inner surfaces of the sheet portions bearing a second desired printed image. The self-adhesive label is manufacutred from a support web comprising a self-adhesive backed material carried on a release backing material. The lower surface of the lower sheet portion and the lower surface of the extending part of the upper sheet portion of the sheet being adhered to the upper surface of the self-adhesive backed material, and a weakened tear line extends across that part of the upper sheet portion which covers the lower sheet portion whereby the tear line can be torn thereby to unfold the label and reveal the two opposed inner surfaces. There is also provided a method and apparatus for producing such labels on a length of release backing material.

14 Claims, 5 Drawing Figures

METHOD AND APPARATUS FOR MAKING LABELS

BACKGROUND TO THE INVENTION

The present invention relates to labels and to a method and apparatus for their production and in particular to a method and apparatus for producing folded lithographically printed self-adhesive labels.

DESCRIPTION OF THE PRIOR ART

My British Patent Specification No. 2122968 (Application No. 8218496) discloses a method and apparatus for producing a succession of lithographically-printed self-adhesive labels on a length of release backing material. There is now a demand for high quality pre-printed labels, such as lithographically-printed labels, for use in the labelling of containers where it is desired for the label to carry more printed textual information than can reasonably be fitted onto the surface area of the container. Furthermore, there is a demand for such labels to carry concealed information when attached to a container.

British Patent Specification No. 1510638 discloses a two-ply folded label in which a first label is superimposed over a second label and the first and second labels are coextensive except at the common folded edge between the two labels. The first label has at least two cutaway sections which reveal portions of the second label, and those portions and the first label can be adhered to a container. The second label has a removable or hingeable panel to reveal at least a part of the first panel. However, the label disclosed therein is not a self-adhesive label but is rather merely an individual folded sheet to which adhesive must be applied in order to adhere the label to a container. There is also no disclosure of how the labels are manufactured.

SUMMARY OF THE PRESENT INVENTION

The present invention relates to a method and apparatus for producing high quality, lithographically printed labels for continuous application to containers to be labelled, the labels being folded and being operable to reveal previously hidden label surfaces on which textual information is printed.

Accordingly, the present invention provides a self-adhesive label on a release backing material comprising a sheet which has been folded so that an upper sheet portion covers, and extends over an edge of, a lower sheet portion, the upper surface of the upper sheet portion bearing a desired lithographically printed image and the two opposed inner surfaces of the sheet portions bearing a second desired printed image. The self-adhesive label is manufactured from a support web comprising a self-adhesive backed material carried on a release backing material. The lower surface of the lower sheet portion and the lower surface of the extending part of the upper sheet portion of the sheet being adhered to the upper surface of the self-adhesive backed material, and a weakened tear line extends across that part of the upper sheet portion which covers the lower sheet portion whereby the tear line can be torn thereby to unfold the label and reveal the two opposed inner surfaces.

The present invention further provides a method of producing a succession of folded lithographically-printed self-adhesive labels on a length of release backing material, the method comprising the steps of:

(a) providing a plurality of sheets carrying on one side thereof a first desired image produced by lithographic printing and on the other side thereof a second desired printed image;

(b) folding each of the sheets so that an upper sheet portion covers, and extends over an edge of, a lower sheet portion, the upper surface of the upper sheet portion carrying the first image and the two opposed inner sheet surfaces carrying the second image;

(c) adhering the lower surface of the lower sheet portion, and the lower surface of the extending part of the upper sheet portion, of each of the folded sheets succesively to a support web comprising a self-adhesive backed material carried on a release backing material, the folded sheets being adhered to the upper surface of the self-adhesive backed material;

(d) cutting through the adhered folded sheets and through the self-adhesive backed material as far as the release backing material thereby to form the required folded labels with the upper sheet portion being connected to the lower sheet portion via a fold line;

(e) removing the unwanted portions of the printed sheets and the self-adhesive backed material adhered thereto from the release backing material; and (f) forming, at any stage in the method, a weakened tear line in each sheet so that in the resultant labels the tear line extends across that part of the upper sheet portion which covers the lower sheet portion and can be torn thereby to unfold the label and reveal the said two opposed inner surfaces.

The present invention further provides apparatus for producing a succession of folded lithographically-printed self-adhesive labels on a length of release backing material, comprising means for transferring individual folded lithographically-printed sheets in succession from a stack of such sheets to a support web comprising a self-adhesive backed material carried on a release backing material, each sheet having an upper sheet portion and a lower sheet portion and being folded so that the upper sheet portion covers, and extends over an edge of, the lower sheet portion, the upper surface of the upper sheet portion carrying a first lithographically-printed image and the two opposed inner sheet surfaces carrying a second printed image, means for adhering the lower surface of the lower sheet portion and the lower surface of the extending part of the upper sheet portion of each sheet to the upper surface of the self-adhesive backed material, a cutting device for cutting the adhered folded sheets and the self-adhesive backed material to form the required labels with the upper sheet portion being connected to the lower sheet portion via a fold line; means for removing the unwanted portions of the printed sheets and the self-adhesive backed material from the release backing material, and means for forming, either prior to or subsequent to adhering the sheets to the support web, a weakened tear line in each sheet so that in the resultant labels the tear line extends across that part of the upper sheet portion which covers the lower sheet portion.

DESCRIPTION OF THE PREFERRED EMBODIMENTS

Figure 1:
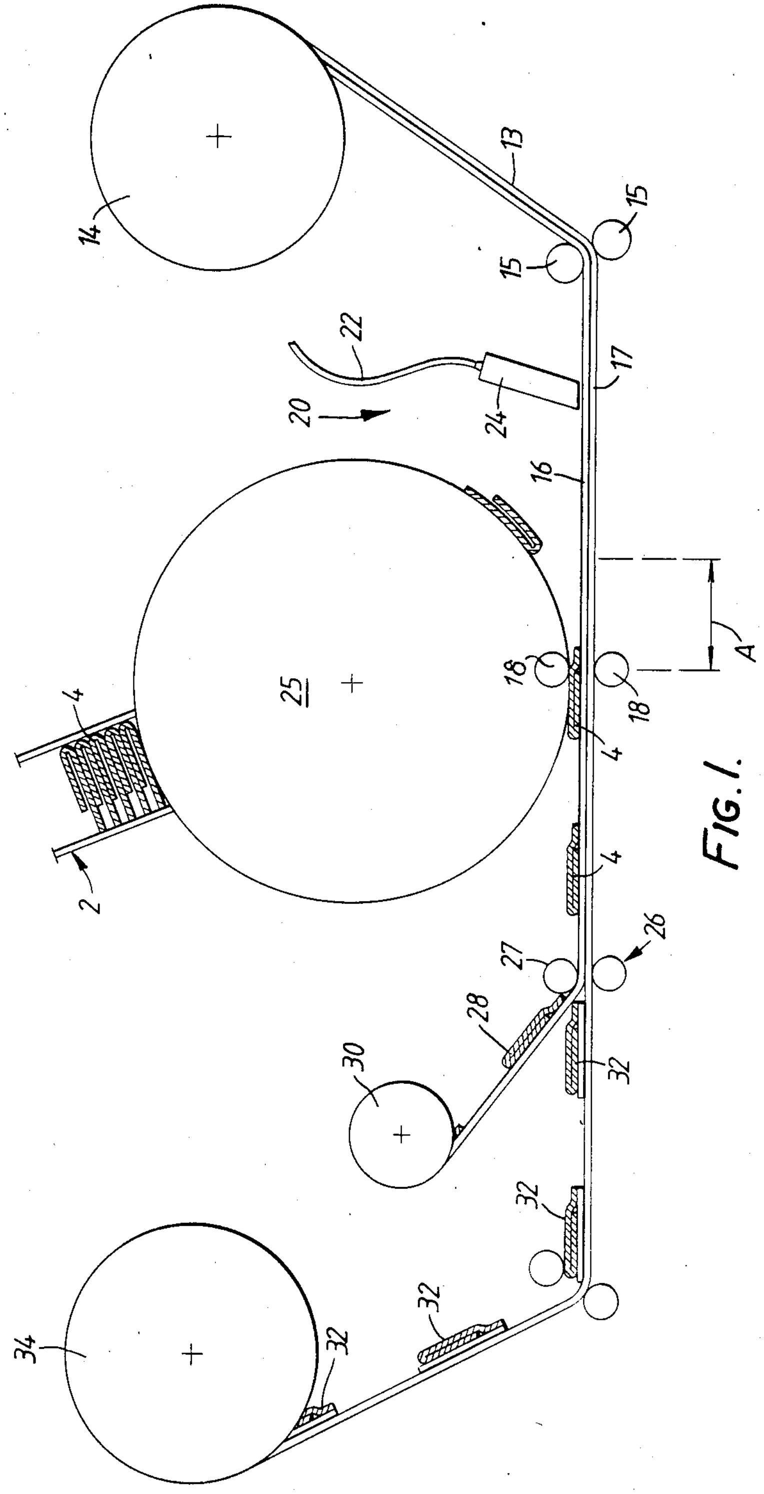
FIG. 1 shows a diagram of one embodiment of an apparatus in accordance with the invention.

Referring to FIG. 1, there is shown an apparatus for preparing a reel carrying a succession of lithographically printed labels, the apparatus comprising a stack 2 of lithographically printed folded sheets 4.

Figure 2:
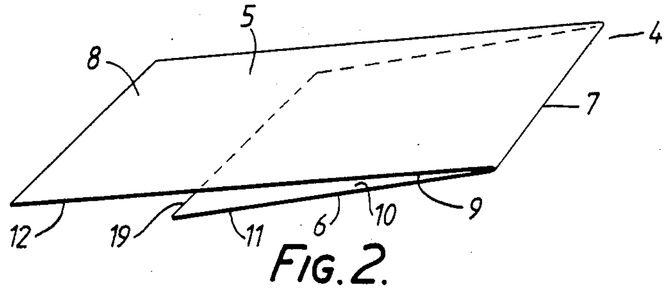
FIG. 2 is a perspective view from the side of a folded sheet to be adhered to a support web in the apparatus of FIG. 1.

A preferred folded sheet 4 is shown in FIG. 2 in greater detail. The sheet 4 includes two sheet portions 5,6 which are folded about a fold line 7. The upper surface 8 of the sheet 4 is printed lithographically with a desired image. The two opposed inner surfaces 9,10 are printed, either lithographically or otherwise, with a desired image. The lower sheet portion 6 is equal in width but shorter in length than the upper sheet portion 5 so that the lower surface of the sheet 4 consists of the whole of the lower surface 11 of lower sheet portion 6 and the overlapping lower surface portion 12 upper sheet portion 5. The folded sheet 4 is folded so that upper sheet portion 5 extends over an edge 19 of lower sheet portion 6.

In the stack 2, the sheets 4 are arranged to be fed individually and successively to a support web 13 unwound under slight tension from a reel 14 via guiding rollers 15. The support web 13 is a double-layered material preferably consisting of an adhesive-backed paper 16 with the adhesive side of the paper being protected by a release backing material 17 such as silicone-faced backing paper. The lower surface of each individual lithographically-printed sheet 4 is adhered to the upper surface of the adhesive-backed layer of the support web 13 by coating the upper surface of the support web 13 with a suitable adhesive, such as pVA adhesive, and then applying each printed sheet 4 in turn to the upper surface of the support web 13 whereupon the resultant composite is passed through nip rollers 18 which ensures complete adhesion of the lithographically-printed sheets 4 to the support web 13. The adhesive is applied to the support web 13 at a coating station 20 upstream of zone A at which the sheets 4 are brought into contact with the support web 13. At the coating station 20 adhesive is supplied from a reservoir (not shown) via a conduit 22 to an applicator 24 from which adhesive is applied on to the upper surface of the support web 13.

In an alternative embodiment, instead of applying adhesive to the upper surface of the support web 13, the adhesive is applied to the rear face of each printed sheet 4 before the sheets 4 are applied to the support web.

In a further alternative embodiment, the support web 13 consists of a layer 16 of a plastics film, such as a polyethylene film, both surfaces of which are self-adhesive, one self-adhesive surface being protected by a release backing material 17. In this embodiment, the folded sheets 4 are individually adhered on to the support web 13 by the pressing action of the nip rollers 18 and coating station 20 is not required.

The support web 13 may alternatively consist of a layer 16 of a pressure sensitive self-adhesive vinyl or polyester sheet which is self-adhesive only in its lower surface.

In a still further alternative embodiment the support web 13 consists of a pressure sensitive adhesive-backed paper, vinyl sheet or polyester sheet. When the support web 13 passes through coating station 20, the upper surface of the support web 13 is coated with a heat-sealable lacquer. After the folded sheets 4 have been applied to the support web 13 which is coated with the heat-sealable lacquer, the heat-sealable lacquer is subsequently cured by passing the resultant assembly of sheets 4 and support web 13 through heated pressure means such as heated rollers which are located downstream of zone A. The cured lacquer adheres the sheets 4 to the support web 13. Instead of applying the heat-sealable lacquer to the support web 13, the heat-sealable lacquer may be applied to the rear face of each sheet 4 before the sheets 4 are applied to the support web 13.

After a first sheet 4 has been adhered to the support web 13, a subsequent sheet 4 is brought into position on the support web 13 behind the first sheet 4 and adhered to the support web in a manner as described above. The sheets 4 are transferred individually from the stack 2 of sheets to the support web 13 by suitable transfer means 25. In a preferred arrangement, the transfer means includes rotary indexable arms carrying vacuum activated suction pads for holding and releasing the folded sheets 4 to be transferred from the stack 2 of sheets to the support web 13. The support web 13 and the transfer means 25 are arranged so that their relative movement can be adjusted to produce a desired gap between adjacent sheets, which gap is required when the leading edge of the folded sheets 4 on the support web 13 is the folded edge 7 (as shown in FIG. 1), for reasons which will be described hereinbelow. Alternatively, when the leading or trailing edge is not the folded edge, the relative movement can be adjusted to produce an overlap between adjacent sheets or to ensure that adjacent sheets abut.

Figure 3:
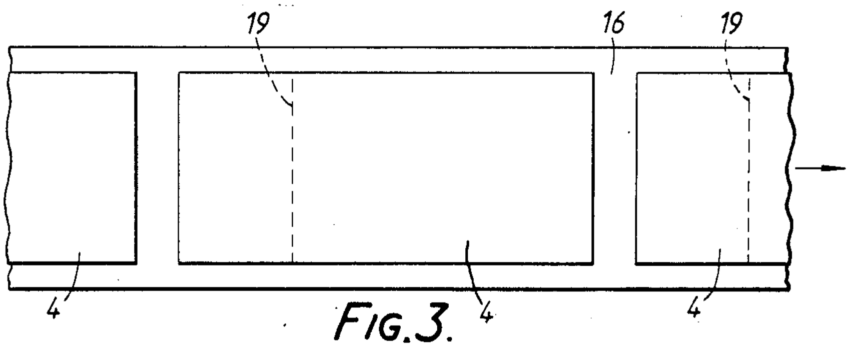
FIG. 3 is a plan view of the folded sheet of FIG. 2 when adhered to the support web.

After passing through the nip rollers 18, the support web 13 and the succession of sheets 4 adhered thereto are as shown in FIG. 3. The sheets 4 are adhered in succession on the adhesive-backed paper 16. The arrow shows the direction of motion of the support web 13 and sheets 4. The leading edge of the sheets is the folded edge 17 and the dotted line indicates the trailing edge 19 of the lower sheet portion 6. The sheet 4 is held in its folded position and the whole of the lower surface of the sheet 4 is adhered to adhesive-backed paper 16.

The support web 13 and sheets 4 are then conveyed to a die-cutting station 26 where a die-cutting roller 27 is arranged to cut through the folded sheets 4 and through the adhesive backed paper 16 of the support web 13 to which the folded sheets 4 have been adhered, but not through the release backing material 17 of the support web 13. Different die-cutters 27 may be used to produce labels of different shapes and sizes. However, the arrangement is such that the folded edge of the folded sheet 4 is not cut away from the rest of the folded sheet so that after the sheet 4 has passed through the die-cutting station 26, the sheet 4 is still folded and is held in that position by virtue of sheet portions 5 and 6 still each being adhered to adhesive-backed paper 16. After the required shape has been cut into the said layers of material, the waste portions 28 of the said layers are removed from the release backing material 17 and taken up on a reel 30 while the labels 32 thus produced remain on the release backing material 17 and are wound up into the form of a reel 34 for subsequent removal from the backing material and application to a container to be labelled.

Figure 4:
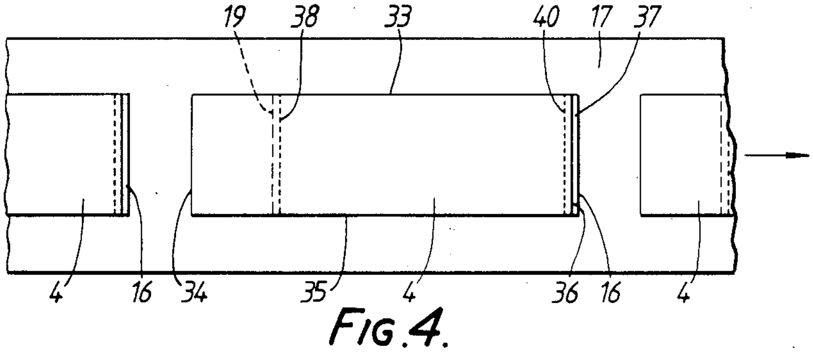
FIG. 4 is a plan view of the adhered folded sheet of FIG. 3 after it has been cut to form a label in accordance with the invention.

FIG. 4 shows the release backing material 17 and sheets 4 of FIG. 3 after they have passed through the die-cutting station 26. Each sheet 4 has been cut through on three sides 33, 34, 35 so as to give the required size and shape of the label. The folded edge 36 has not been cut away. There is adjacent to and generally parallel with the folded edge 36 a narrow band 37 of adhesive backed paper 16. Such a band 37 must be present since the die-cutting operation must separate adjacent labels 32 by cutting the adhesive backed paper 16 and by not cutting the folded edge 37 from each label 32. The band 37 is made as narrow as possible and its width is dependent upon the accuracy of the alignment between the die-cutter 27 and the position of the sheets 4 on the support web 13. It has been found in practice that a suitable width of the band 37 is 5 mm.

When the leading or trailing edge of the sheets 4 is not the folded edge, the die-cutting operation may be carried out as described above, but with that side edge of the sheet 4 which has the fold line 7 not being cut away. In this arrangement, it will readily be seen that adjacent sheets 4 can abut on the release backing material 17.

Figure 5:
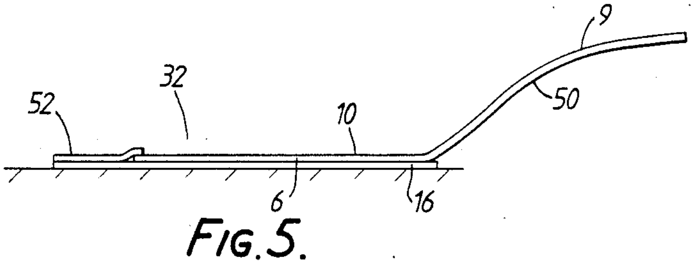
FIG. 5 is a sectional view through the label of FIG. 4 after it has been opened.

During the production of the labels 32, a weakened tear line, such as, for example, a line of perforations, is formed in that portion of the sheet 4 which is to be the upper portion in the resultant label, whereby the line of perforations can be torn thereby to open the folded label 32 and reveal the two opposed inner surfaces 9,10. As is shown in FIG. 4, a transverse line of perforations 38 may be provided in the upper sheet portion of the label 32. The line of perforations 38 is preferably parallel with and located generally above and slightly inwardly of the dotted line 19 which defines the trailing edge of the lower sheet portion 6 of the sheet 4. When the line of perforations 38 is torn, the label 32 can be opened to the unfolded position shown in FIG. 5. The two inner surfaces 9,10 are revealed and the upper sheet portion 5 is divided into two portions, 50,52.

In practice, the line of perforations 38 can be formed at any convenient stage during the production of the labels. For example, the die-cutting station 26 could also cut the line of perforations 38. The die-cutting roller 27 could have a suitably profiled surface so that as each folded sheet 4 passes through the die-cutting station 26, the line of perforations 38 could be cut into the upper portion of the sheet at the correct location. Alternatively, the line of perforations could be formed in the sheets 4 prior to adhering them to the support web 13.

It will be apparent to a person skilled in the art that the relative sizes and shapes of the sheet portions 5 and 6 can be varied so as to produce a variety of labels. For example, the lower sheet portion 6 can be almost the same size as the upper sheet portion 5 provided that a sufficiently large overlapping part of sheet portion 5 is provided for it to be adhered to the support web 13.

Furthermore, as is illustrated in FIG. 4 in a further preferred arrangement, a second line of perforations 40 can be provided in sheet portion 5. The second line of perforations 40 can be positioned parallel to and closely adjacent fold line 7 so that part of sheet portion 5 which is between the two lines of perforations can be torn away along those lines and removed. The second line of perforations 40 can be formed at the same time as the first line of perforations 38.

It will be appreciated that the present invention provides means of obtaining in an economic manner high quality lithographically-printed folded labels which can be opened to reveal previously hidden textual information and which are in a form highly suited for efficient use in the packaging field for easy application to containers which are to be labelled.

What is claimed is:

1. Aparatus for producing a succession of folded lithographically-printed self-adhesive labels on a length of release backing material, comprising;

a sheet transferring means for transferring individual folded lithographically-printed sheets in succession from a stack of such sheets to a support web, comprising a self-adhesive backed material carried on a release backing material, each sheet having an upper sheet portion and a lower sheet portion and being folded so that the upper sheet portion covers, and extends over an edge of the lower sheet portion, the upper surface of the upper sheet portion carrying a first lithographically-printed image and the two opposed inner sheet surfaces carrying a second printed image, support web comprising a self-adhesive backed material carried on a release backing material, means, an adhesive applicator for applying adhesive to the upper surface of the self-adhesive backed material whereby the lower surface of the lower sheet portion and the lower surface of the extending part of the upper sheet portion of each sheet are adhered by the adhesive backed upper surface of the self-adhesive backed material, a cutting device for cutting the adhered folded sheets and the self-adhesive backed material to form the required labels with the upper sheet portion being connected to the lower sheet portion via a fold line;

a waste removing means for removing the unwanted portions of the printed sheets and self-adhesive backed material; and means for forming subsequent to adhering the sheets to the support web, a weakened tear line in each sheet so that in the resultant labels the tear line extends across that part of the upper sheet portion which covers the lower sheet portion.

2. Apparatus according to claim 1, wherein the means for forming a weakened tear line includes means for forming a second weakened tear line in each sheet so that in the resultant labels the second tear line extends across the upper sheet portion and and is parallel to the first tear line.

3. Apparatus according to claim 2, wherein said means for forming a weakened tear line is a cutting device.

4. Apparatus according to claim 3, wherein the cutting device incorporates the means for forming the line or lines of perforations.

5. Apparatus according to claim 4, wherein the cutting device comprises a pair of die-cutting rollers.

6. A method of producing a succession of folded lithographically-printed self-adhesive labels on a length of release backing material, the method comprising the steps of:

(a) providing a plurality of sheets carrying on one side thereof a first desired image produced by lithographic printing and on the other side thereof a second desired printed image;

(b) folding each of the sheets so that an upper sheet portion covers, and extends over an edge of, a lower sheet portion, the upper surface of the upper sheet portion carrying the first image and the two opposed inner sheet surfaces carrying the second image;

(c) adhering the lower surface of the lower sheet portion, and the lower surface of the extending part of the upper sheet portion, of each of the folded sheets successively to a support web comprising a self-adhesive backed material carried on a release backing material, the folded sheets being adhered to the upper surface of the self-adhesive backed material;

(d) cutting through the adhered folded sheets and through the self-adhesive backed material as far as the release backing material thereby to form the required folded labels with the upper sheet portion being connected to the lower sheet portion via a fold line;

(e) removing the unwanted portions of the printed sheets and the self-adhesive backed material adhered thereto from the release backing material; and (f) forming, at any stage in the method, a weakened tear line in each sheet so that in the resultant labels the tear line extends across that part of the upper sheet portion which covers the lower sheet portion and can be torn thereby to unfold the label and reveal the said two opposed inner surfaces.

7. A method according to claim 6, wherein during step (b) the sheets are folded only once.

8. A method according to claim 6, wherein during step (c) the sheets are adhered to the support web with a folded edge of the upper sheet portion being transverse the length of the support web.

9. A method according to claim 8, wherein the said folded edge of the upper sheet portion is the leading edge of the folded sheets on the support web.

10. A method according to claim 6, wherein during step (f) the weakened tear line is formed so that in the resultant labels the tear line is positioned above and generally parallel to the said edge of the lower sheet portion.

11. A method according to claim 6, further comprising the step of forming a second weakened tear line in each sheet so that in the resultant labels the second tear line extends across the upper sheet portion and is positioned adjacent and parallel to the folded edge of the upper sheet portion.

12. A method according to claim 6, wherein each weakened tear line is a line of perforations.

13. A method according to claim 6, wherein during step (d) in the region of the fold line the self-adhesive backed material is cut through along a line which is adjacent to and generally parallel with the fold line.

14. A method according to claim 6, wherein the self-adhesive backed material is self-adhesive on each side thereof and in the adhering step (c) the folded sheets are pressed onto the upper self-adhesive surface of the self-adhesive backed material.

* * * * *